US007757366B2

(12) United States Patent
Vorley et al.

(10) Patent No.: US 7,757,366 B2
(45) Date of Patent: Jul. 20, 2010

(54) COUPLING FOR CONNECTING TUBES WITH A NUT-RUNNER

(75) Inventors: Stephen W. Vorley, Aberdeenshire (GB); John S. Giles, Aberdeenshire (GB)

(73) Assignee: Marine Direct Consultants Ltd., Westhill (GB)

( * ) Notice: Subject to any disclaimer, the term of this patent is extended or adjusted under 35 U.S.C. 154(b) by 10 days.

(21) Appl. No.: 12/348,410

(22) Filed: Jan. 5, 2009

(65) Prior Publication Data

US 2009/0108579 A1    Apr. 30, 2009

Related U.S. Application Data

(62) Division of application No. 10/524,695, filed as application No. PCT/NO03/00283 on Aug. 18, 2003.

(30) Foreign Application Priority Data

Aug. 19, 2002   (NO)   ................................. 20023926

(51) Int. Cl.
   *B23P 11/00*   (2006.01)
   *F16L 35/00*   (2006.01)
(52) U.S. Cl. .............................. 29/428; 29/464; 29/446; 29/469; 29/237; 285/18; 285/39; 285/368
(58) Field of Classification Search .................. 29/464, 29/446, 469, 237, 272, 428; 285/18, 39, 285/95, 101, 106, 145.4, 148.5, 368, 412, 285/920
   See application file for complete search history.

(56) References Cited

U.S. PATENT DOCUMENTS 3,353,847 A    11/1967   Brown
3,645,563 A *   2/1972   Rochelle ....................... 285/24
4,012,059 A     3/1977   Luke et al.
4,019,334 A *   4/1977   Sinclair et al. .............. 405/169
4,093,281 A     6/1978   Jansen, Jr.
4,133,557 A *   1/1979   Ahlstone ...................... 285/39
4,133,558 A *   1/1979   Ahlstone ...................... 285/39
4,150,477 A     4/1979   Orr
4,153,281 A     5/1979   Ahlstone
4,191,256 A *   3/1980   Croy et al. .................. 166/343
4,239,266 A *   12/1980  Mynhier ...................... 285/323
4,496,172 A *   1/1985   Walker ........................ 285/18
4,725,080 A *   2/1988   Josefiak et al. ................ 285/24
4,856,594 A *   8/1989   Jennings ..................... 166/338
5,058,929 A    10/1991   Zentner et al.
5,226,231 A *   7/1993   De Leebeeck ............... 29/237
5,640,748 A *   6/1997   Harrison ..................... 29/272
6,775,890 B2 * 8/2004   Kolarik ....................... 29/235
6,929,287 B2 * 8/2005   Flindall ....................... 285/18

FOREIGN PATENT DOCUMENTS

GB            707988 A    4/1954
WO   WO 2004016977 A1 *  2/2004

* cited by examiner

*Primary Examiner*—Essama Omgba
(74) *Attorney, Agent, or Firm*—Ladas & Parry LLP (57) ABSTRACT

A coupling for connecting pipes, having a seal, flanges, a threaded portion and a nut, where the end portion of the pipe is equipped with a concentric press surface located immediately proximal to the periphery of the pipe and designed to be able to take an axial pressure from a preloading tool, which pressure is distributed evenly or point-by-point about the periphery of the pipe. The preloading tool has two end sections connected to two or more rods, each rod being equipped with a hydraulic cylinder.

6 Claims, 10 Drawing Sheets

Cross section 1-1

Cross section 2-2

Cross section 3-3

Fig. 10

COUPLING FOR CONNECTING TUBES WITH A NUT-RUNNER

This application is a Divisional Application of U.S. Ser. No. 10/524,695 filed May 25, 2005, which claims priority to International Application No. PCT/NO2003/000283, filed on Aug. 18, 2003, which claims priority to Norwegian Application No. 2002 3926, filed on Aug. 19, 2002.

This invention regards a means of connecting pipes, particularly with a view to remotely operated and mechanized execution.

In petroleum production in particular, many extensive and demanding pipelaying operations are carried out both on shore and under water. Traditionally, work on underwater pipelines is carried out by divers; however the industry has advanced to a point where pipe lines are laid at depths which can not be reached by divers. Consequently, the work has to be carried out by remotely operated robots. Pipe joints to be joined by robots are often expensive.

In the case of land-based joining of pipes, the pipe joints are more readily accessible, but the process is still demanding.

The principal elements of any pipe joint are:
Pipe fittings to bear and distribute the forces of compression caused by the surroundings, such as the water pressure at great depths and/or the weight of the covering materials and also the axial loads caused by stretching and bending of pipes during and after laying;
Coupling elements to keep the pipe fittings together;
Seals to maintain a leak proof connection;
A method of preloading the pipe joint where the applied load is greater than the combination of the compression energy taken up by the seal, the liquid or gas pressure in the pipe, and the stress from the surroundings.

When connecting pipes, it is important to keep control of the prestress level. If the prestress is too low, the joint may open up and leak when subjected to a high internal pipe pressure. If the prestress is set too high, the pipe joint may be overloaded.

Traditional pipe joints have been executed with bolted flanges, where a number of threaded bolts are distributed around the flange, and (a) seal(s) maintains a tight connection. The bolts are tightened to the desired level in accordance with the load to be carried. When the bolt tightening torque increases, the frictional forces during rotation of the nut become considerable.

For that reason, hydraulic jacking systems are to a certain extent used with large flanges in order to preload some of the pipe joint elements by placing a hollow jack over each flange bolt and applying the specified pressure. The nuts are screwed in to the flange. The jack is relieved and the load is transferred to the bolts. This method is preferred because it allows the possibility of controlling the load applied to the flange.

From U.S. Pat. No. 4,150,477 there is known a method in which a prestress load is applied point by point to pipe flanges by means of hydraulic jacks, prior to the bolts being put in place and tightened. The disadvantage of this method of preloading is that the length of the pipe, which is subjected to axial elastic deformation, is very short. In addition, the point-by-point applied load gives unequal deformation along the circle of division of the boltholes.

The greatest disadvantage of most types of flange connections is that they include many parts and are difficult to work on using a remotely operated tool. In addition, a clearance for the preloading tool is required around the bolts, making it necessary for the bolts to be positioned at a distance from the pipe. Thus the flanges must be relatively thick in order to absorb the bending forces in the flange.

Other methods of connecting pipes use collars and clamps. The collars are welded to the pipe ends. The clamp is a large jointed device that is placed over the collars to force these together so as to activate the seal(s). The pre-stress is applied through one or two large bolts positioned at right angles to the longitudinal axis of the pipe pulling the clamp members together in the radial direction. Sliding surfaces between the clamp and the collars ensure that the pipe ends are pressed together. This system is easier to operate using a remotely operated tool, but the components are relatively heavy and expensive.

The object of the invention is to remedy the disadvantages of prior art.

The object is achieved in accordance with the invention by the characteristics given in the description below and in the appended claims.

A pipe joint according to the invention is constructed with the following main components:
a) Each pipe end comprises engagement and sealing surfaces that ensure guidance of the pipe ends during the connecting operation and give a tight connection.
b) One end of the pipe has a portion with a male thread, preferably in shape of a rotating threaded collar located behind a flange and preferably arranged to be forced against the flange by means of a preloading tool.
c) The opposite pipe end has a flange.
d) A nut is located behind the flange of the opposite pipe end. The rear portion of the nut has an internal surface of contact formed in a manner such that when the nut is carried out over the flange, the internal ledge at the rear edge of the nut abuts the radial rear face of the flange. An external flange is preferably located in the opposite end of the nut and preferably arranged to be forced against the flange by means of a preloading tool. The thread dimension of the nut corresponds to the male thread on the adjacent pipe end. The thread diameter is larger than the flanges of the pipe ends.
e) Each pipe end is arranged to allow a preloading tool to compress the pipe ends by gripping around the pipes and apply an axial directed movement. This preferably comprises a concentric press surface on one or both pipe ends immediately proximal to the pipe coupling parts and right up against the periphery of the pipe. These press surfaces are shaped to make a contact face for the preloading tool.

The elements a), b), c) and e) may be formed directly in the pipe material using the appropriate technology, or they may be formed in separate coupling parts that are connected to the end portions of the pipe using the appropriate per se technology.

The invention comprises the application of an axial load immediately proximal to the periphery of the pipe at and directly outside of the connection area, so that intermediate seals and pipe ends are subjected to elastic deformation. The pipes are joined with a nut coupling that absorbs a portion of the applied deformation forces. The pipe ends and the seals are compressed, and the nut couplings are tensioned with a combined clamping and joining tool.

A preloading tool comprises two moving end sections designed to grip respective pipes and an actuator designed to press each end section axially against the press surfaces of the pipe, the nut flange or the rear portion of the threaded collar thus pressing the pipe ends against each other.

Locking devices that are known per se are integrated into the end sections, keeping the preloading tool together when the tool encloses the pipe joint. Upon releasing the locks, the tool may be opened and led radially away from the pipe.

Preferably, the preloading tool comprises a nut runner equipped with preferably hydraulic driving means and a cog wheel that, when the tool is positioned around the pipe joint, catches external teeth on the nut or the threaded collar of the pipe joint.

The preloading tool is connected to a hydraulic system known per se comprising a pump, tank, operating valves, pressure control devices and more.

When connecting two ready-to-be-installed pipes, two opposite pipe ends are brought together using the appropriate manipulator equipment. The preloading tool is positioned over the pipe joint and closed. Then the end sections of the tool are pulled together so as to press against the press surface of one of the pipe ends and also against the nut flange or the threaded collar's rear portion. Then the load specified for the type of pipe in question is applied to the seal and the pipe section positioned between the two press surfaces.

The elastic compression of the preloaded area consists of:
1) The specified elastic compression of the seal at nominal work load.
2) Additional compression in the seal during the preloading phase.
3) Compression in the pipe ends between the press surfaces of the preloading tool during the preloading phase.

In addition an elastic extension of the nut alternatively an elastic compression of the male threads (integrated in pipe end or in collar) is applied.

At extension of the nut the collar is screwed into the blocked nut until abutment between the forward end of collar and the radial face of the corresponding pipe flange. At use of the alternative compression of the male threaded section the nut is screwed onto the male threads until abutment between the internal load bearing surface of nut and the radial face of the corresponding pipe flange.

The joining of nut and male threads is preferably accomplished mechanically, by activating a nut runner connected to or integrated in the preloading tool making the joint up to the specified torque. Then the preloading tool is relieved so as to partially transfer the load to the nut. Upon relief, the elastic deformation in the seal and pipe ends is reduced.

The rigidity of the nut coupling must be matched to the elasticity of the seal, so that the compression of the seal remains as specified for the nominal workload (ref. 1 in the former section) after relief.

In order for the seal to maintain its specified compression at the nominal work load, the extension of the nut coupling upon taking up the work load must not exceed:
4) the additional elastic compression applied to the seal during the preloading phase (=former point 2), plus
5) elastic compression in that portion of the pipe ends which is located between the working faces of the nut coupling against the pipe flanges.

It follows that the quality and dimensions of the nut materials must be closely matched to the elasticity of the seal.

It also follows that it is preferable to extend the nut and/or compress the threaded portion prior to joining, as this means that the nut coupling is already preloaded and tensioned before assuming the workload.

At use of a preloaded nut the extension of the joint is caused by compression of the male threaded section. Due to the short distance to the pipe flange the total extension of the joint will approve relatively small.

At use of a preloaded male threaded section the extension of the joint is basically caused by the stretching of the nut. The nut is relatively long compared to the male threaded section, thus approving a larger extension of the joint.

After the workload has been transferred to the nut coupling, the preloading tool is opened and retracted from the coupling.

In the case of subsea work, the preloading tool is typically mounted on an ROV (Remotely Operated Vehicle). On shore, it may be integrated into a pipe laying equipment, suspended from a lifting tackle, be installed on a hydraulically operated lever arm, or similar.

BRIEF DESCRIPTION OF THE DRAWINGS FIGURES

The following describes a non-limiting example of a preferred embodiment illustrated in the accompanying drawings, in which.

DETAILED DESCRIPTION OF THE PREFERRED EMBODIMENTS

Figure 1:
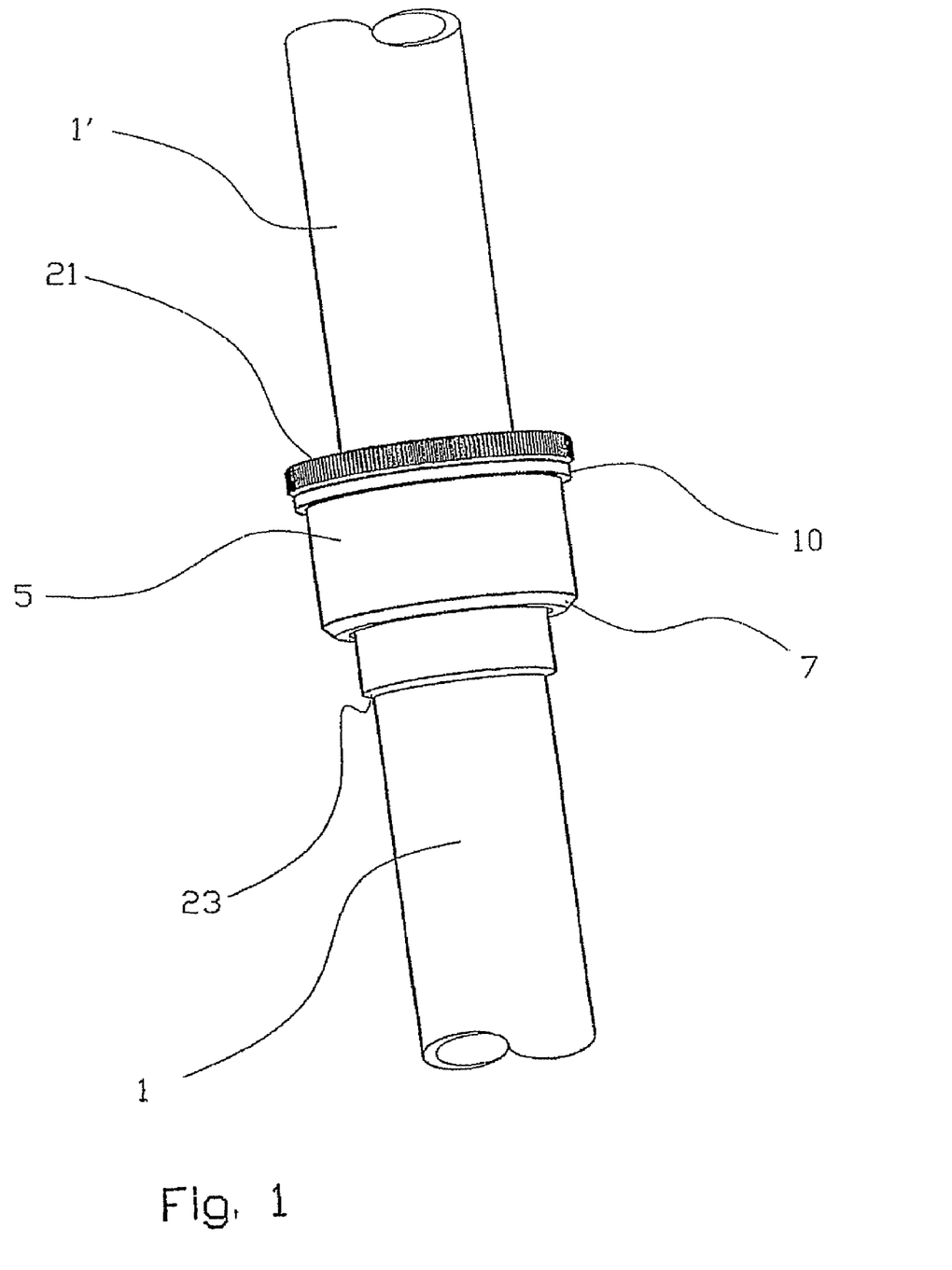
FIG. 1 shows a joined pipe coupling.
Figure 2:
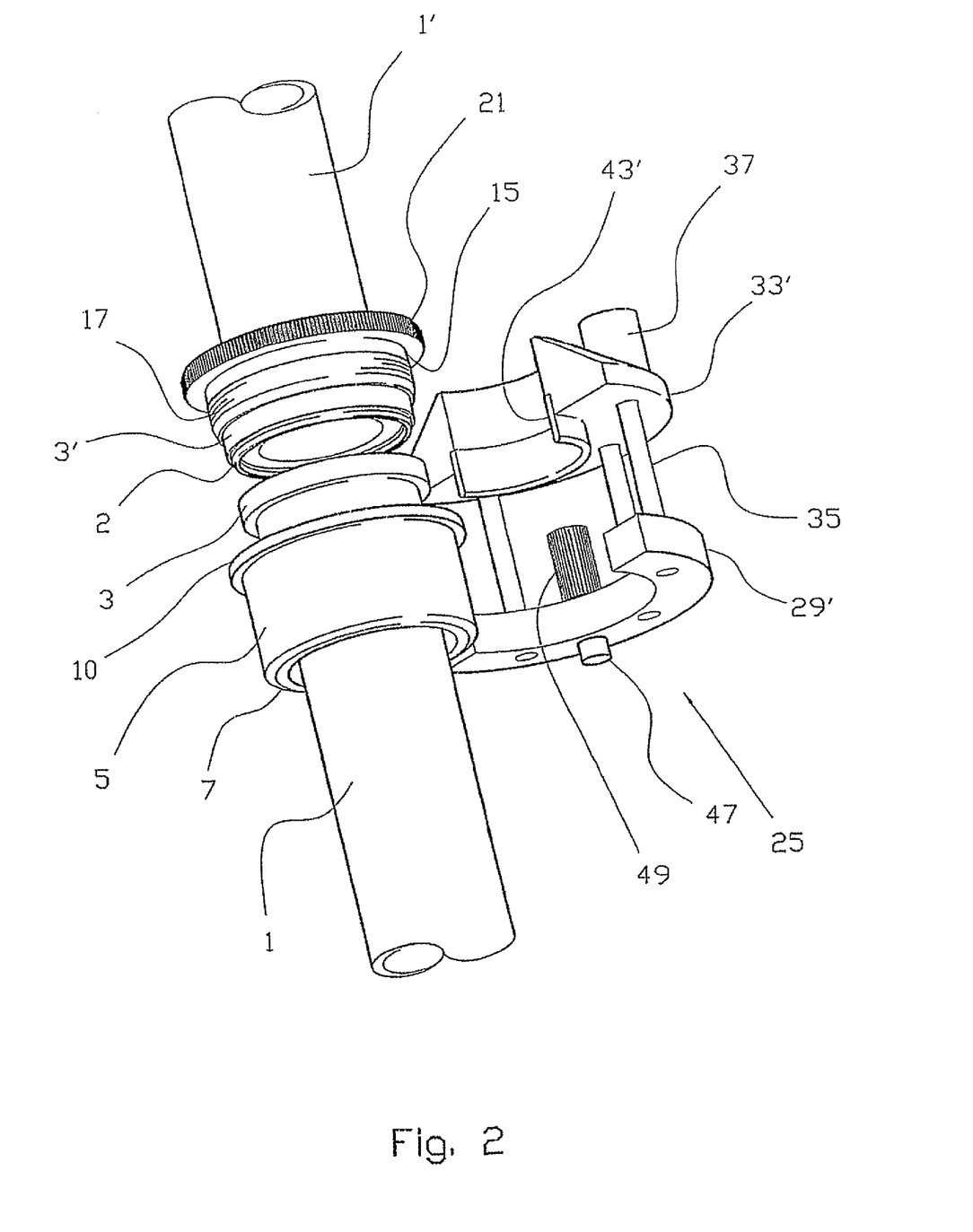
FIG. 2 shows a pipe coupling ready to be joined, with the preloading tool placed near the coupling (the drawing only shows one half of the preloading tool)
Figure 3:
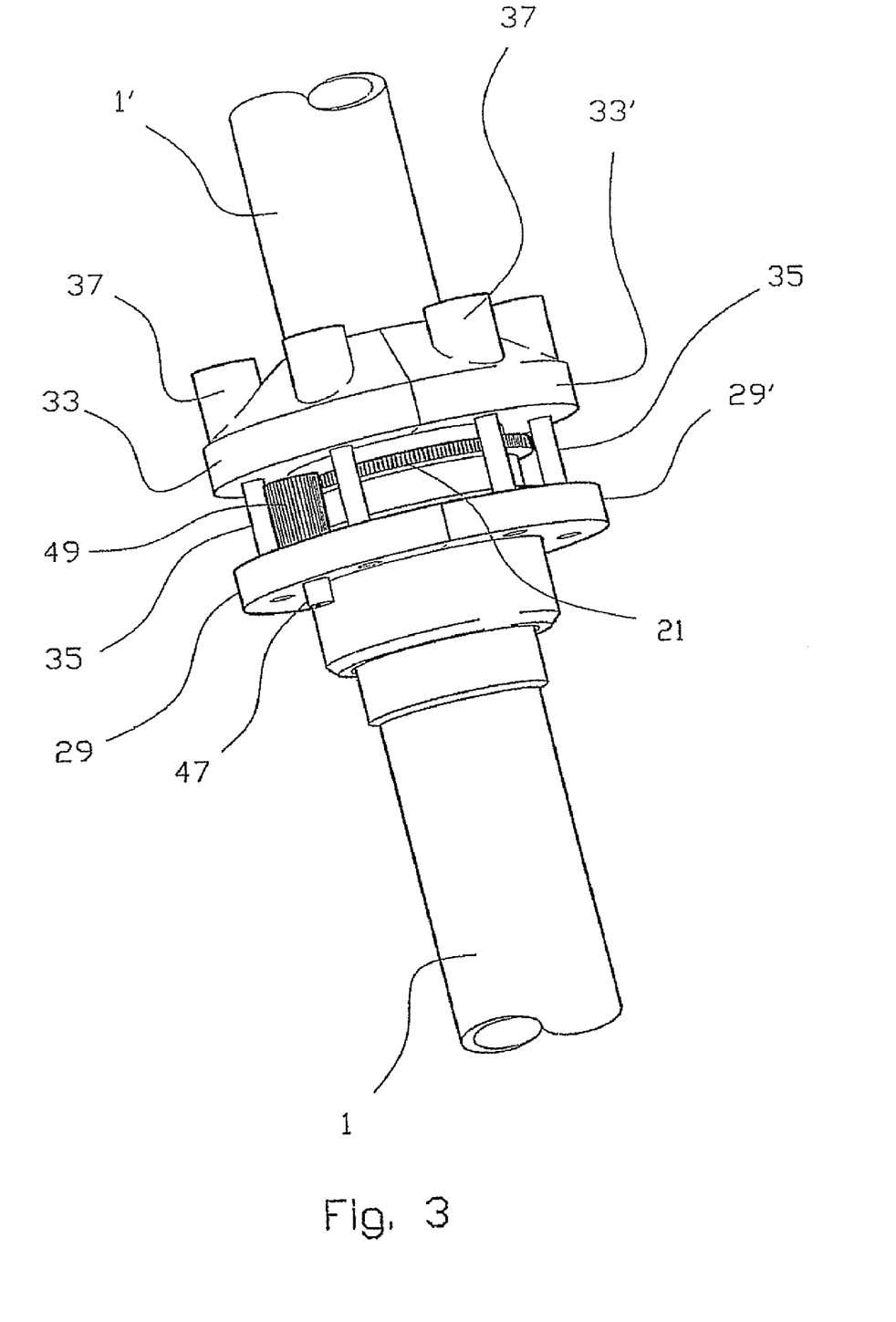
FIG. 3 shows the preloading tool closed around a pipe coupling.
Figure 4:
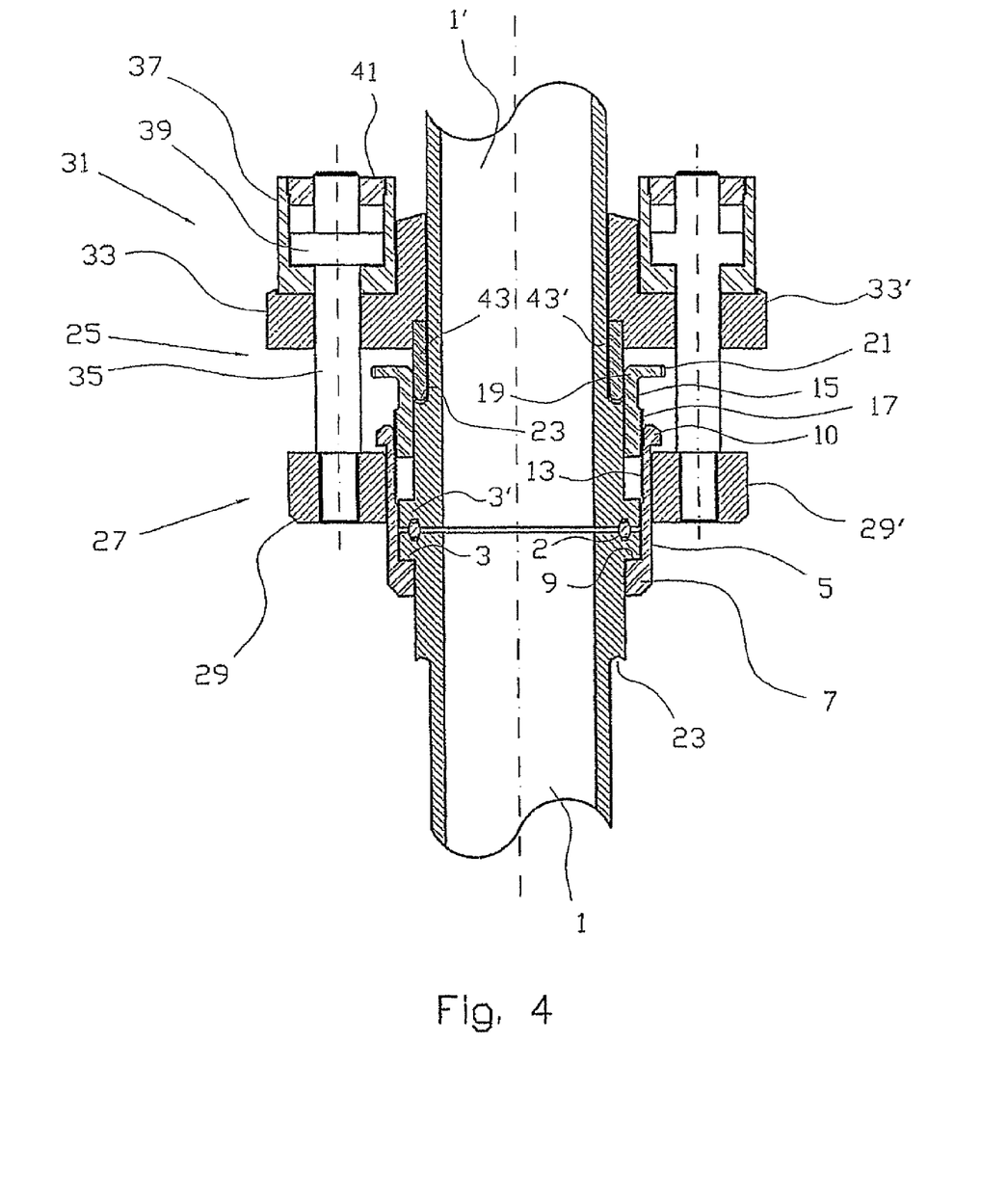
FIG. 4 shows a longitudinal section through a pipe coupling with a preloading tool prior to preloading and joining (the nut runner is not shown)
Figure 5:
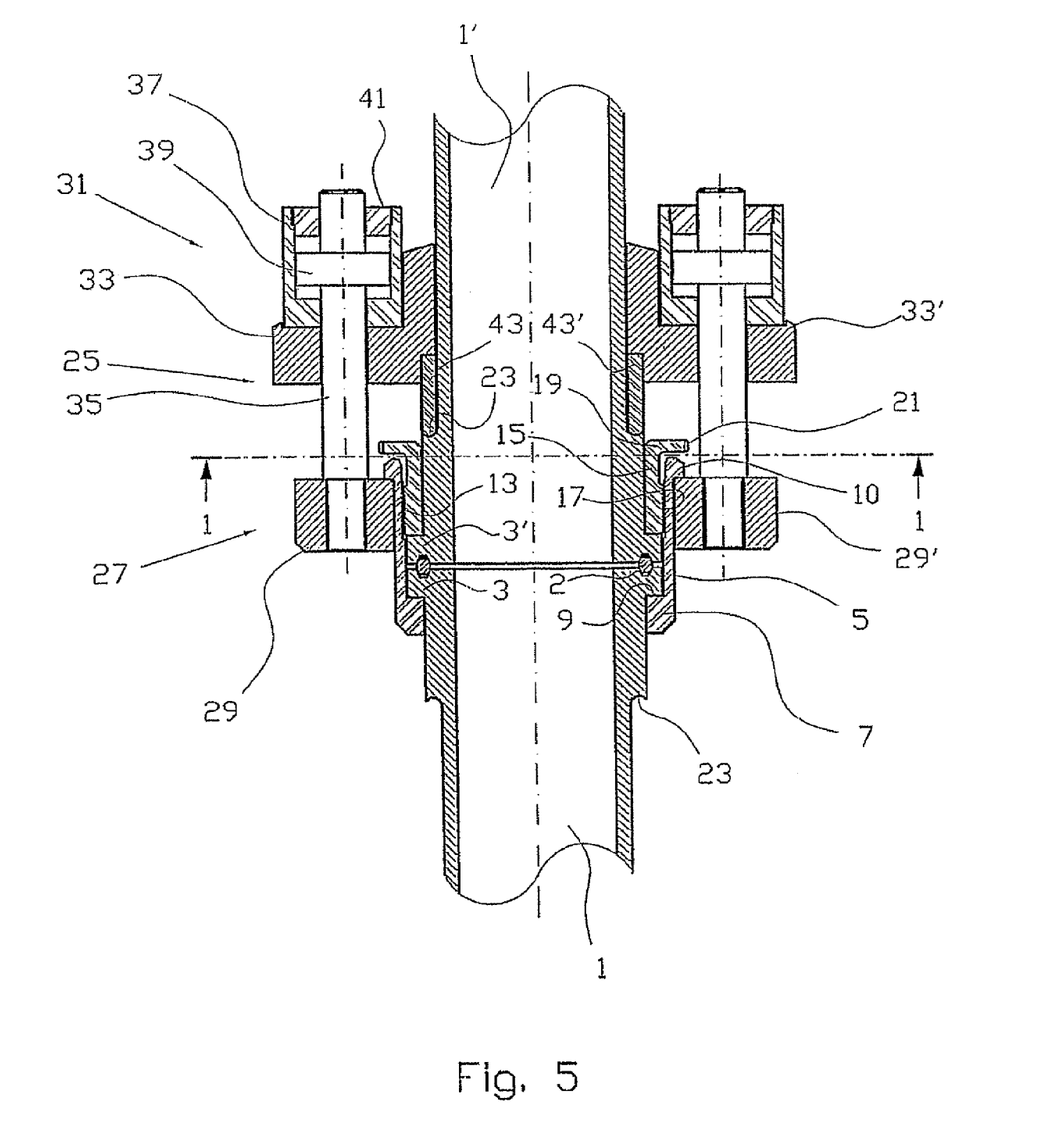
FIG. 5 shows a longitudinal section through a joined pipe coupling with the preloading tool in the contracted position (the nut runner is not shown)
Figure 6:
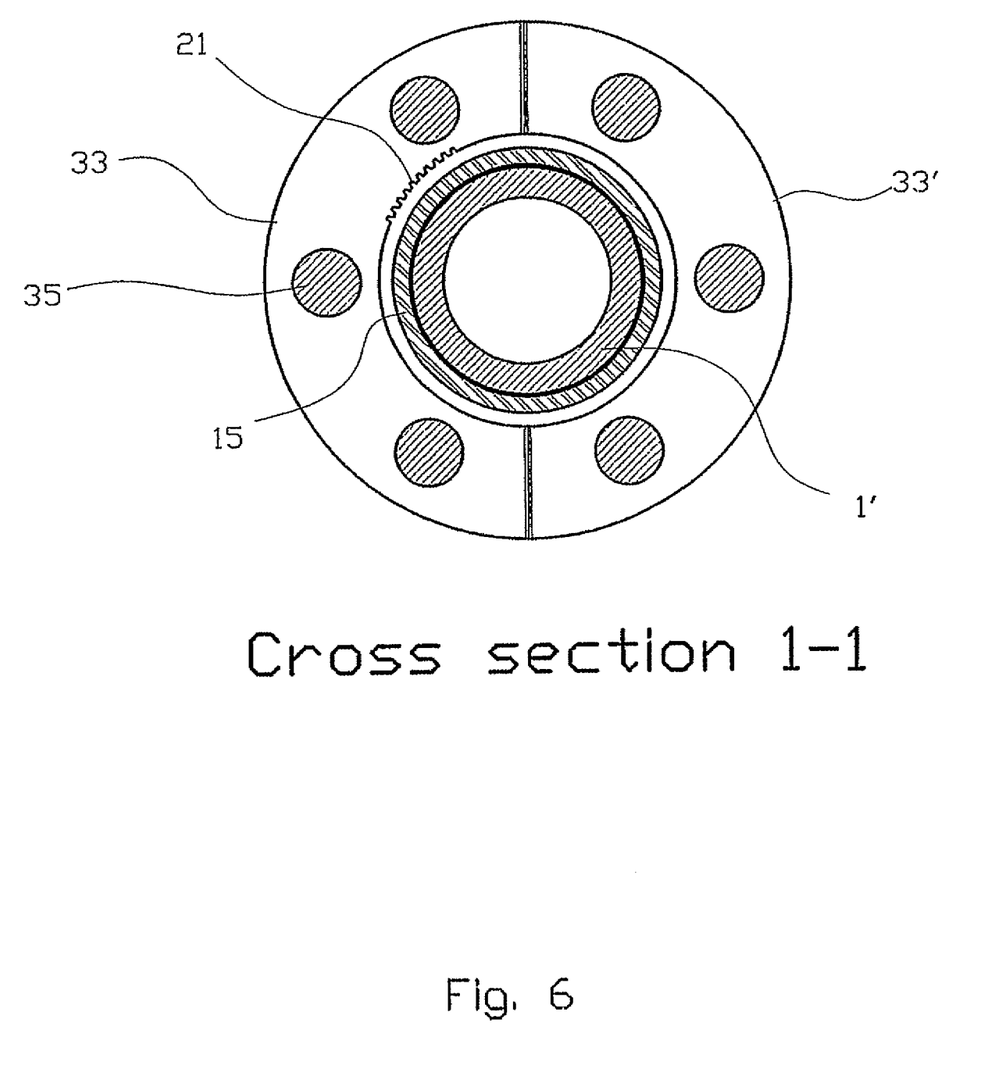
FIG. 6 shows a cross section through a pipe coupling and preloading tool.
Figure 7:
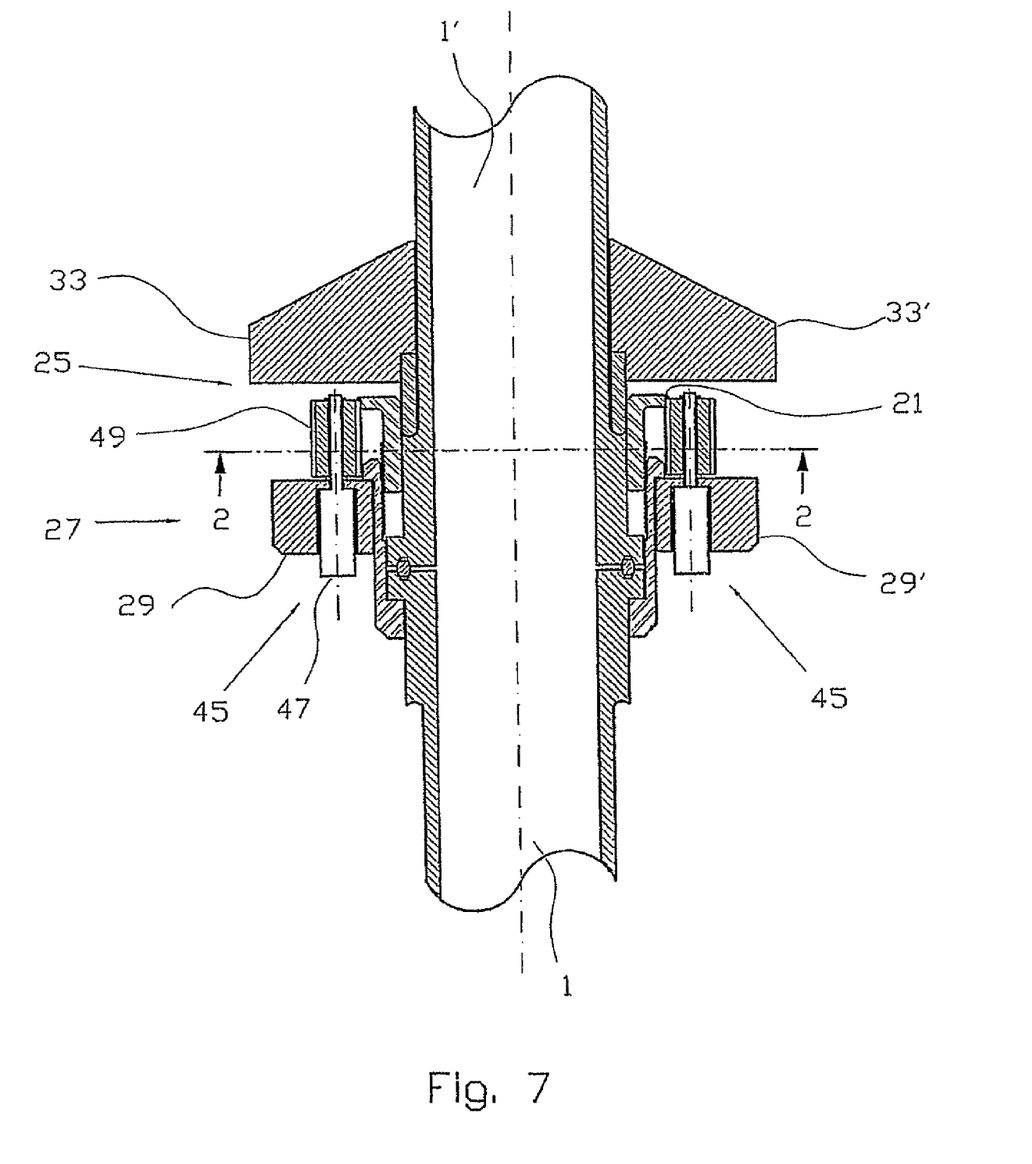
FIG. 7 shows a longitudinal section made through the nut runner of the preloading tool.
Figure 8:
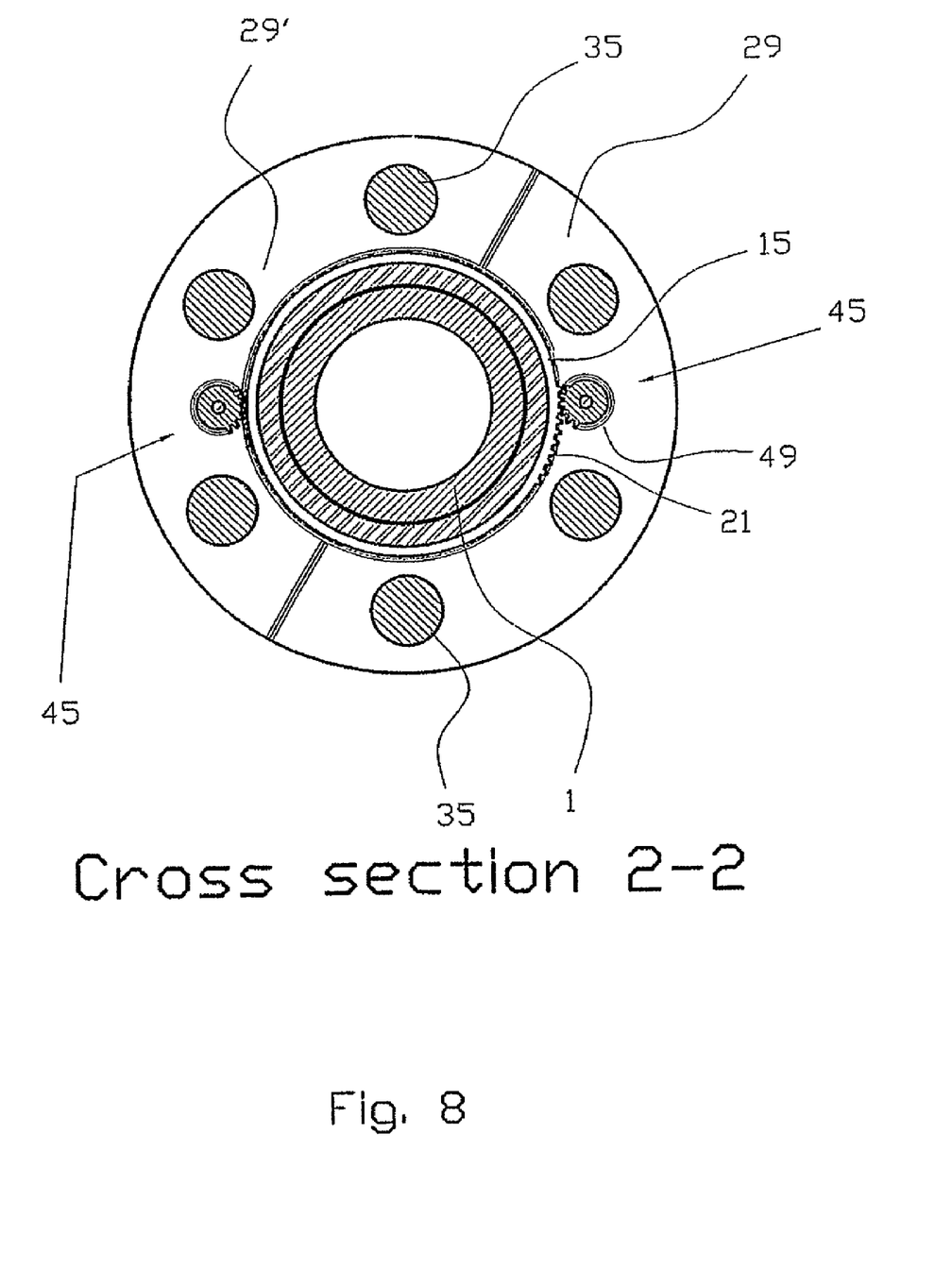
FIG. 8 shows a cross section through the nut runner of the preloading tool.
Figure 9:
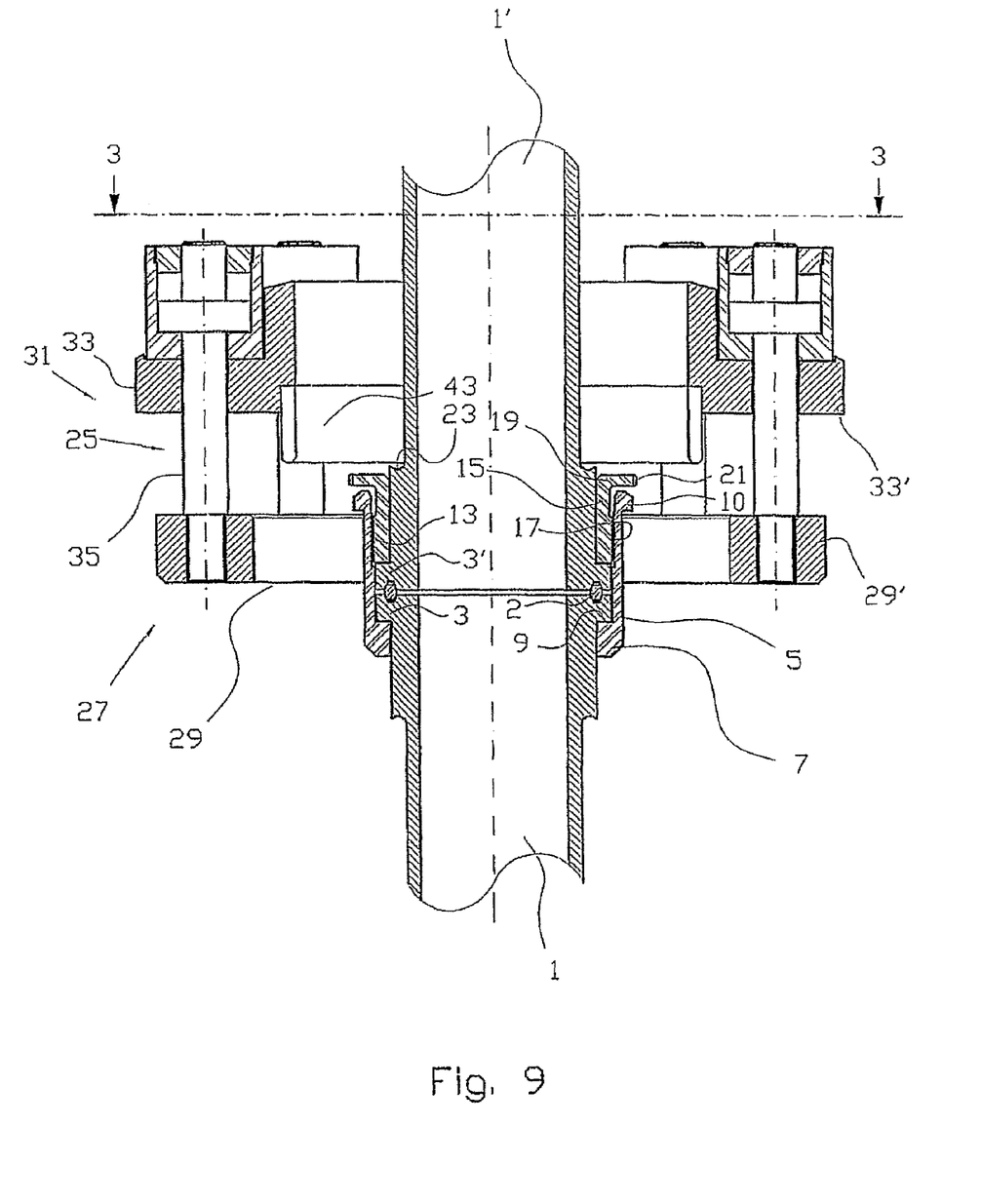
FIG. 9 shows a longitudinal section through a pipe coupling with the preloading tool partially retracted from the coupling.
Figure 10:
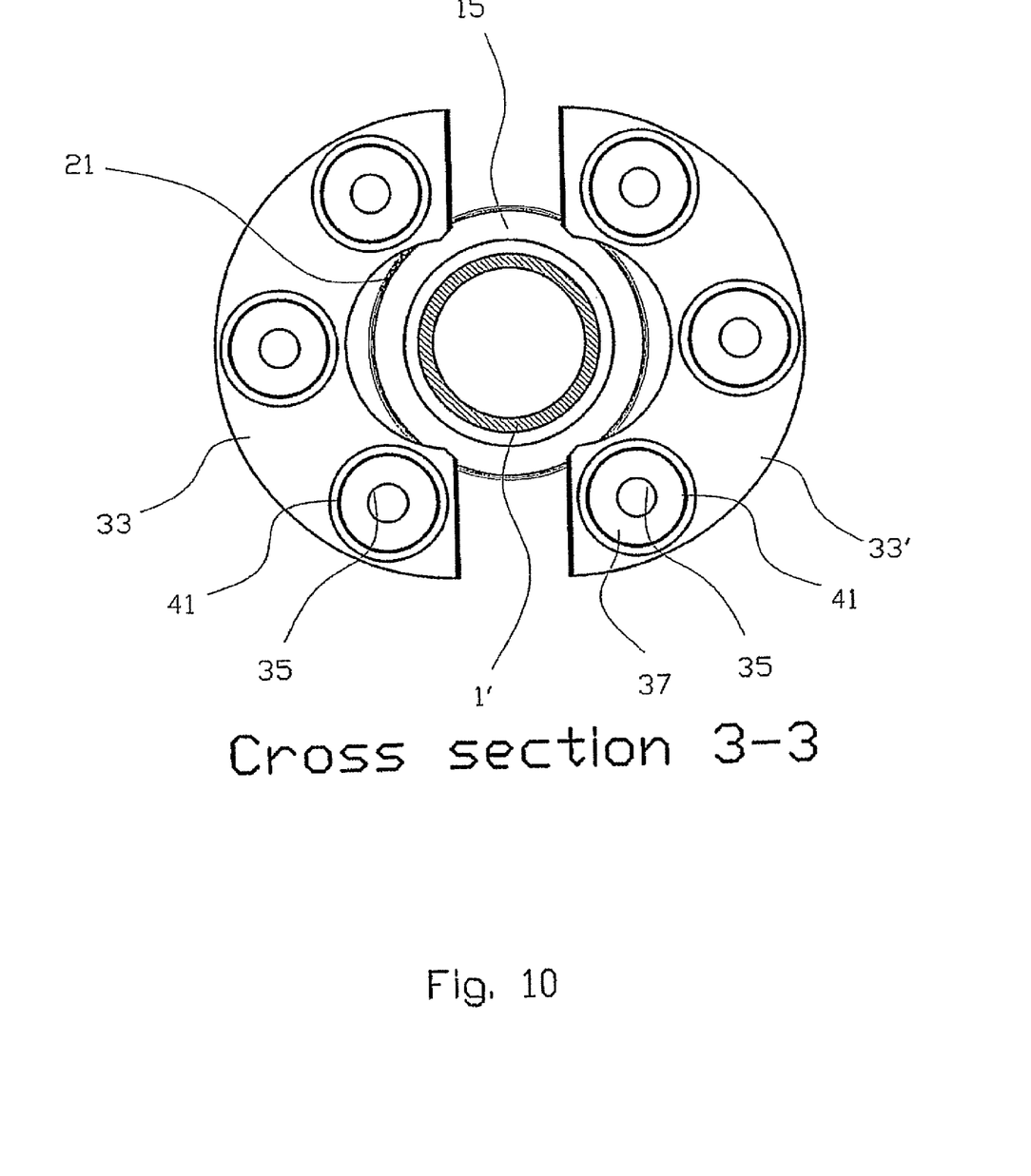
FIG. 10 shows a cross section through a pipe with the preloading tool partially retracted from the pipe coupling.

In the drawings, reference number 1, 1' denotes end portions of two pipes. Between the pipe ends 1, 1', a seal 2 is placed in appropriate grooves. One end portion 1 is equipped with a flange 3 and a nut 5. The nut 5 comprises a rear portion 7 with an internal load bearing surface 9 that corresponds to the flange 3. The nut 5 is provided with an external flange 10. Internally, the nut 5 is provided with a threaded portion 13.

The other end portion 1' is equipped with a flange 3' and a threaded collar 15 with a male thread portion 17 that corresponds to the threaded portion 13 of the nut 5. The rear portion 19 of the threaded collar has external teeth 21.

The end portions 1, 1' are equipped with a concentric, predominantly radial press surface 23.

A preloading tool 25 comprises a first end section 27. This is made up of two section parts 29, 29'. The second end section 31 is made up of two section parts 33, 33'. Two or more rods 35 with associated hydraulic cylinders 37, piston 39 and seals (not shown) connect the section parts 29, 33 and 29', 33'. The cylinder is fitted with a detachable gland 41 and seals (not shown).

Preferably, the section parts 33, 33' are provided with a replaceable clamping profile 43, 43' that corresponds to the profile of the press surface 23.

The section parts 29, 33, respectively 29', 33', joined by the rods 35 are separately connected to a device (not shown) that by means of e.g. hydraulic force may open and close the preloading tool primarily through radial movement relative to the pipe 1, 1'.

In the closed position around the pipe 1, 1', the preloading tool 25 may be kept closed by use of suitable locking devices (not shown).

Preferably, the preloading tool 25 comprises one or more nut runners 45 equipped with driving means 47, as an example a hydraulic motor, and a cog wheel 49 that corresponds to the teeth 21 on the threaded collar 15.

The hydraulic cylinders 37 of the preloading tool 25 are connected up to a hydraulic system (not shown) with an associated pump, tank, valves and control devices.

Coupling of pipes may take place through remote operation of the preloading tool 25. When two pipes have been placed with their corresponding ends 1, 1' sufficiently close to each other through the use of suitable means, and the preloading tool is guided over the end portions 1, 1'. The preloading tool 25 is closed around the end portions 1, 1' by the section parts 29, 29', 33, 33' being moved radially towards the end portions 1, 1'. The end section 27 is pressed against the external flange 10 and the end section 31 is pressed against the end portion 1', so that the press surface 23 coincides with the clamping profile 43, 43' by the operating and control device of the hydraulic system (not shown) carrying the hydraulic cylinders 37 in the correct direction with a pressure adjusted according to the joint dimension in question.

When the end portions 1, 1', the seal 2 and the nut 5 have been subjected to the load specified for the pipe joint dimension, the end portions 1, 1' are held together while the threaded collar 15 is made up to the specified torque.

The threaded collar 15 is preferably tightened with the nut runner 45. This takes place through the cog wheel 49, which abuts the corresponding teeth 21 of the threaded collar 15, being driven with a specified torque by the driving means 47 of the nut runner 45.

When the threaded collar 15 has been tightened, the pressure on the preloading tool 25 is relieved, so as to transfer the load to the nut 5 and the threaded collar 15. The preloading tool 25 is opened, retracted from the completed pipe joint, and prepared for the next coupling.

We claim:

1. A preloading and mounting tool for connecting a first pipe and a second pipe, each having an end portion and a plurality of concentric press surfaces configured to support an axial pressure sufficient to preload a seal, comprising:
    a first and second end sections configured for applying an axial pressure directed towards the pipe end portions;
    a plurality of rods interconnecting the first and second end sections wherein each rod further comprises a hydraulic cylinder; and
    a nut runner configured to intermittently engage a rotatable pipe connector item
       wherein the rotatable pipe connector item is a threaded collar with a toothed periphery located on the end portion of the first pipe, and
       wherein the nut runner comprises a cogwheel allocated to the rotation of the rotatable threaded collar having a toothed periphery by engagement with the toothed periphery.

2. The preloading and mounting tool in accordance with claim 1
    wherein the rotatable pipe connector item is a nut having a toothed periphery located on the end portion of the second pipe, and
    wherein the nut runner comprises a cogwheel allocated to the rotation of the rotatable nut having a toothed periphery by engagement with the toothed periphery.

3. A method of joining end portions of a first pipe and a second pipe at a pipe joint using a preloading and mounting tool, wherein there is a seal between the end portions of the pipes and wherein the end portions have pipe coupling parts, comprising the steps of:
    providing a preloading and mounting tool as in claim 1 wherein the first and second end sections each comprise two section parts;
    positioning the tool over the pipe joint by moving the section parts of each end section of the tool radially towards the end portions of the pipes;
    contacting at least one press surface with the section parts of the first end section, wherein the press surface is located on the end portion of the first pipe immediately proximal to the pipe coupling parts and against the periphery of the pipe, and the section parts of the second end section pressing against an external flange with a threaded portion located on a nut on the end portion of the second pipe, while the section parts of the first end section contact the press surface so that the press surface coincides with a clamping profile thereby carrying a hydraulic cylinder of the first end section of the tool in a direction while at the same time adjusting for pressure to the pipe joint;
    applying an axial pressure towards the pipe end portions with the tool whereby the seal is compressed and the end portions of the pipes are joined at the pipe joint.

4. The method as in claim 3 further comprising the step of rotating a threaded collar with teeth, located on the end portion of the first pipe and which corresponds to the threaded portion of the nut, to tighten the joint to a specified torque, wherein the tool further comprises a nut runner having a driving means and a cog wheel which abuts the teeth of the threaded collar and wherein the driving means drives the nut runner to rotate the threaded collar thereby tightening the joint to the specified torque.

5. A method of connecting pipes, the pipes having at one end a prestressing press surface and a sealing flange configured to accept a seal comprising:
    inserting a seal between a first and a second pipe ends, wherein the first pipe end has a nut with a surface arranged to bear on a flange and arranged for accepting axial pressure from a preloading tool, wherein the second pipe end having a collar being in threadable relationship with the nut, wherein at least one of the nut and collar being rotatable on the pipe;
    drawing the first and second pipe ends together;
    fitting a preloading tool around the drawn together pipe ends; and
    operating the tool so that the pipe ends are drawn further together in a sealing relationship;
    applying an axial prestressing pressure to the nut and the opposite pipe end to compress the seal;
    screwing the collar and the nut together; and
    releasing the prestressing pressure by withdrawing the tool thereby transferring the axial pressure to the nut and collar.

6. A pipe connector assembly comprising:
    a preloading tool having a first and a second end sections each having two parts arranged for fitting around drawn together pipe ends;
    a first and a second pipe ends having a prestressing press surface and a sealing flange configured to accept a seal, wherein the first pipe end has a nut with a surface arranged to bear on a flange and configured to accept an axial pressure from the preloading tool,
wherein the second pipe end has a collar in a threadable relationship with the nut,
wherein at least one of the nut and the collar being rotatable on the pipe;

a seal; and
a hydraulic device for drawing the first and second pipe ends together to compress the seal and prestress the nut and the opposing pipe end.

* * * * *